United States Patent [19]
Viaud

[11] Patent Number: 5,224,328
[45] Date of Patent: Jul. 6, 1993

[54] ROUND BALER

[75] Inventor: Jean Viaud, Sarreguemines, France

[73] Assignee: Deere & Company, Moline, Ill.

[21] Appl. No.: 833,870

[22] Filed: Feb. 11, 1992

[30] Foreign Application Priority Data

Feb. 19, 1991 [DE] Fed. Rep. of Germany ....... 4105078

[51] Int. Cl.⁵ .............................................. A01D 39/00
[52] U.S. Cl. ....................................... 56/341; 100/88
[58] Field of Search .................. 56/341, 342; 100/88, 100/89

[56] References Cited

U.S. PATENT DOCUMENTS 3,914,926 10/1975 Braunberger et al. ............... 56/341
4,580,398 4/1986 Bruer et al. ........................ 56/341

FOREIGN PATENT DOCUMENTS 7430874  5/1977 Fed. Rep. of Germany .
2744548  4/1979 Fed. Rep. of Germany .
3501062  7/1985 Fed. Rep. of Germany .
3419535 11/1985 Fed. Rep. of Germany .
3423265  3/1986 Fed. Rep. of Germany .
3811649  6/1989 Fed. Rep. of Germany .
2368214  6/1978 France ................................. 100/89
2227711  8/1990 United Kingdom .

Primary Examiner—Terry Lee Melius

[57] ABSTRACT

The baling chamber of a round baler is provided with a forward wall segment that is pivotally mounted at its top and has a bottom located adjacent a conveyor located at the bottom of the baling chamber. A crop flow sensing device is operative to sense the volume of incoming crop and, in response to increased crop flow, causes the forward wall segment to be moved in such a way that it engages and exerts a lifting force on the bale so as to decrease the resistance of the flow of crop between the bale and the conveyor.

8 Claims, 2 Drawing Sheets

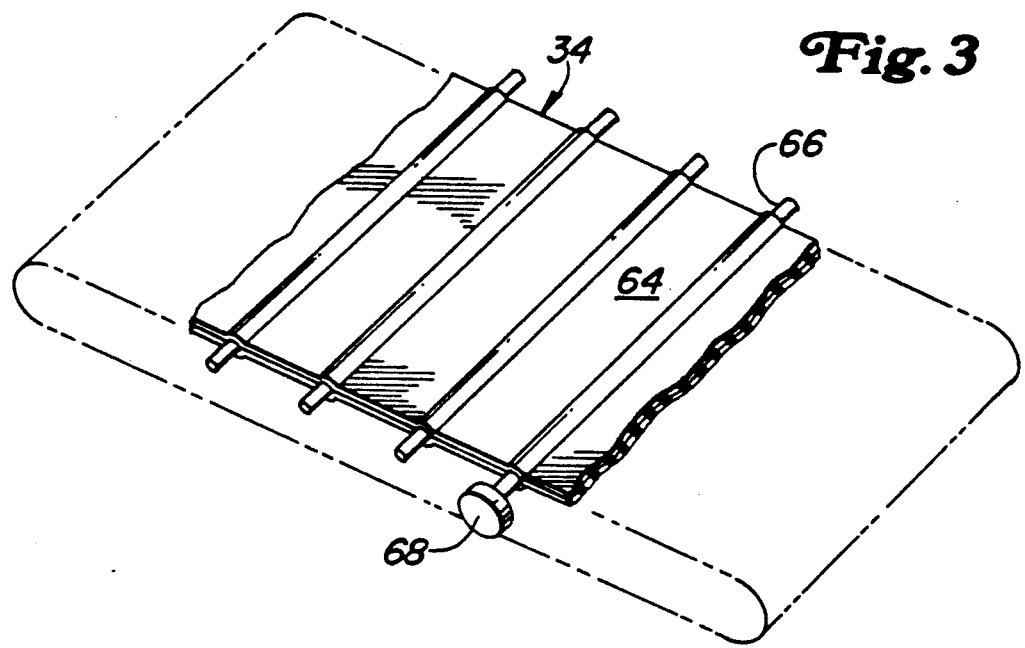
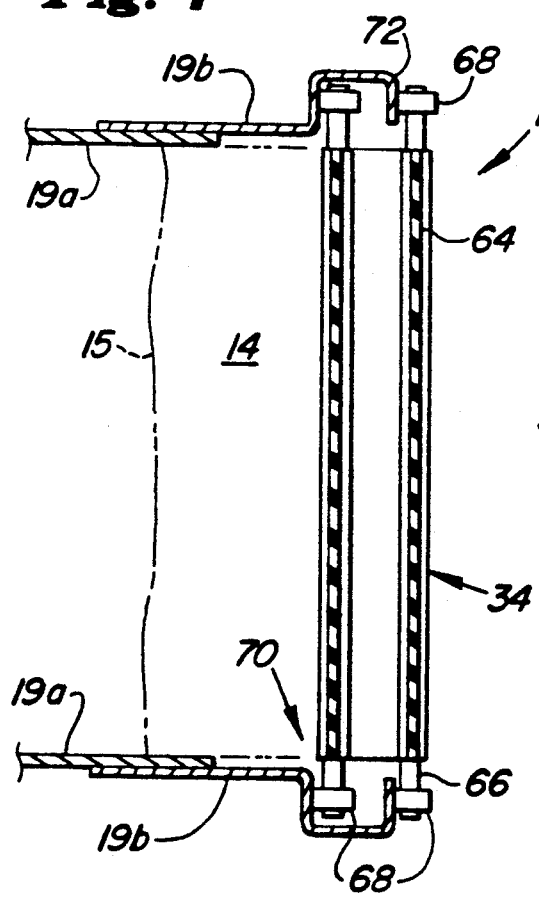
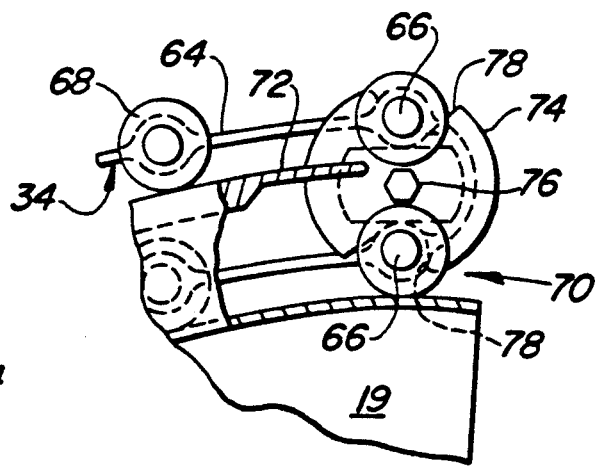

ROUND BALER

BACKGROUND OF THE INVENTION

The invention concerns a round baler, a baler that can produce cylindrical bales, with a baling chamber having a conveyor provided at the bottom thereof on which the bale can be supported and a collector or pick-up for elevating crop from the ground and delivering it to the conveyor.

Round balers are used particularly in agriculture to collect crop deposited on the ground and to compress it into bales. During the baling process the bales are compacted relatively tightly in their outer region and are forced against the wall surrounding the baling chamber due to their weight. This is independent of the question whether the baler is a so-called soft-core or a hard-core baler.

Round balers of this type are known from DE-OS-34 19 535, published Nov. 28, 1985, DE-OS-35 01 062, published Jul. 18, 1985 and GB-A-2 227 711, published Aug. 8, 1990.

From the last named publication it is further known that one of the rollers of the conveyor provided at the bottom, upon which the bale rests during its during its formation, should be shaped as an oval, so that the bale is constantly raised by the roller and remains in this raised position due to the friction at the walls. Thereby a larger inlet area is formed between the oval roller and the inlet opening in a constantly recurring sequence through which the crop can enter the baling chamber without any resistance.

Such an out-of-round rotating roller imposes very high requirements on the strength of its bearings and an enlarged inlet gap develops only when the bale remains in its elevated position by reason of its friction against the wall and the rigidity of its surface.

The problem underlying the invention is seen as that of proposing a round baler in which the crop can enter the baling chamber at all times without any obstacles.

SUMMARY OF THE INVENTION

According to the present invention there is provided a round baler with improved structure for aiding the feeding of crop into the baling chamber.

An object of the invention is to provide a round baler with a sensing and control device which operates to reduce the resistance to the feeding of crop between a bale being formed and a conveyor supporting the bale and defining a lower portion of the baling chamber.

A more specific object of the invention is to provide a sensing and control device which operates to reduce the resistance to the feeding of crop between a bale being formed and a conveyor supporting the bale by exerting a lifting force on the bale in response to a increased crop flow.

Yet a more specific object of the invention is to provide a round baler as set forth in the previous object wherein the crop flow sensing device is a roller suspended by a pair of swinging arms and the baler includes a forward conveyor section which is pivotally mounted and coupled to the roller such that the conveyor section is moved rearwardly against the bale being formed in response to the roller being lifted by incoming crop.

These and other objects will become apparent from reading the ensuing description together with the appended drawings.

BRIEF DESCRIPTION OF THE DRAWINGS

FIG. 3 shows a perspective view of a continuous conveyor of the round baler.

FIG. 4 is a sectional view taken along line 4—4 of FIG. 2.

FIG. 5 shows a side view of a detail of the continuous conveyor.

DESCRIPTION OF THE PREFERRED EMBODIMENT

Figure 1:
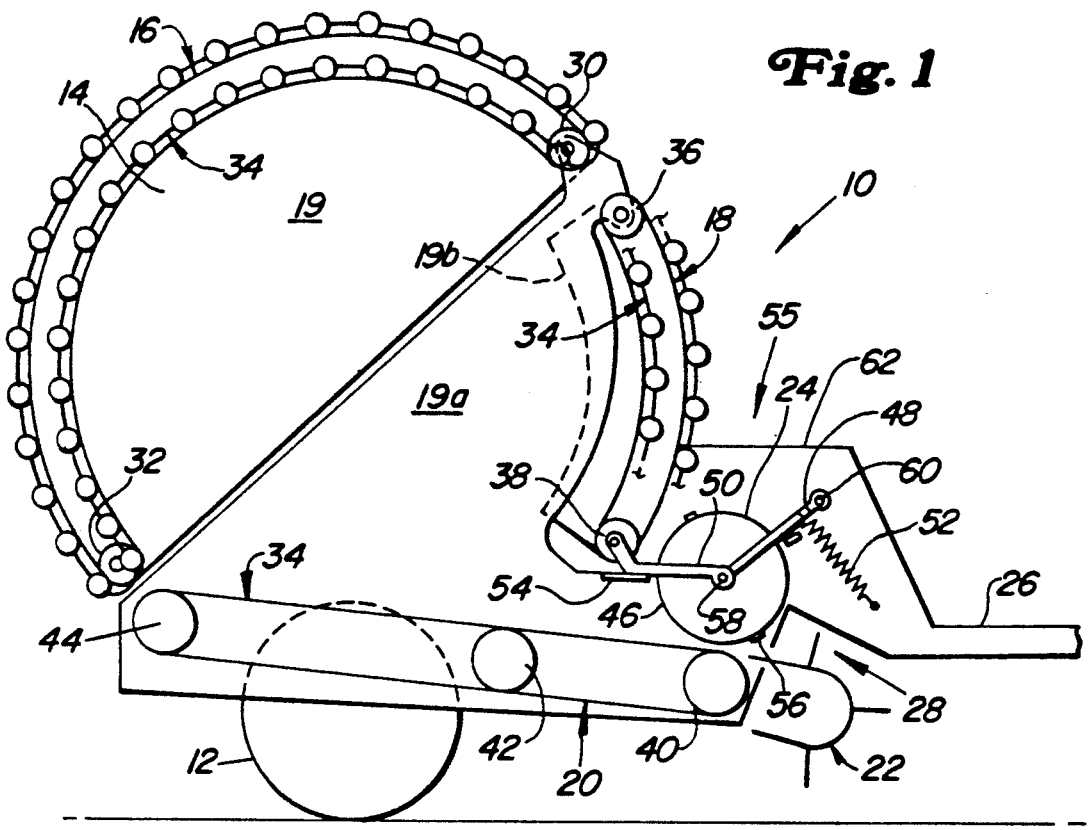
FIG. 1 shows a schematic side view of a round baler constructed according to the invention, with the right hand side of the baler being omitted so as to more clearly show the conveyor segments of the baling chamber and with the baling chamber being shown in an empty condition.

A round baler 10 according to the invention is supported on wheels 12 so that it can move across the ground and contains a baling chamber 14 that is enclosed by a first, rear wall segment 16 and a second, forward wall segment 18. As seen in FIG. 1, the baling chamber 14 is joined by a conveyor 20 at bottom right, at the other end of which a collector or pick-up 22 is provided. Above the conveyor 20 a sensor 24 is arranged, and a drawbar 26 is preferably rigidly connected to a frame component 62 joined to a chassis, not shown, to permit the baler 10 to a be towed across a field.

In the present embodiment, baler 10 is provided with a baling chamber 14 whose volume is generally constant. In order to take up crop deposited on the ground, the baler 10 is coupled with its drawbar 26 to an agricultural tractor (not shown) and moved across the field so that the collector 22 can pick up the crop deposited in windrows. The crop is transported by the conveyor 20 through an inlet opening 28 into the baling chamber 14, where it is compacted into a bale 15.

The baling chamber 14 is enclosed around its circumference generally by the wall segments 16, 18 while its end faces are closed by side walls 19, 19a and 19b which are oriented parallel to the plane of the drawing.

The inner contour of the first wall segment 16 has the shape of a semi-circle and encloses the baling chamber 14 through approximately 180°. In its end regions the upper end is provided with a shaft 30 and at the lower end, a shaft 32. The wall segment 16 can be rotated upward about the shaft 30 in the clockwise direction, as viewed in FIG. 2, in order to eject a completed bale 15. For this purpose conventional actuating means, not shown, are provided. The wall segment 16 is provided not with a rigid, but with a flexible surface, which is formed by a further continuous conveyor 34 described below. The upper shaft 30 is rigidly supported in bearings in the aforementioned side walls 19 and thereby supports the first wall segment 16.

The second, forward wall segment 18 has the same curvature as the first, rear wall segment 16, however, it extends over a considerably smaller arc, only about 70°.

Figure 2:
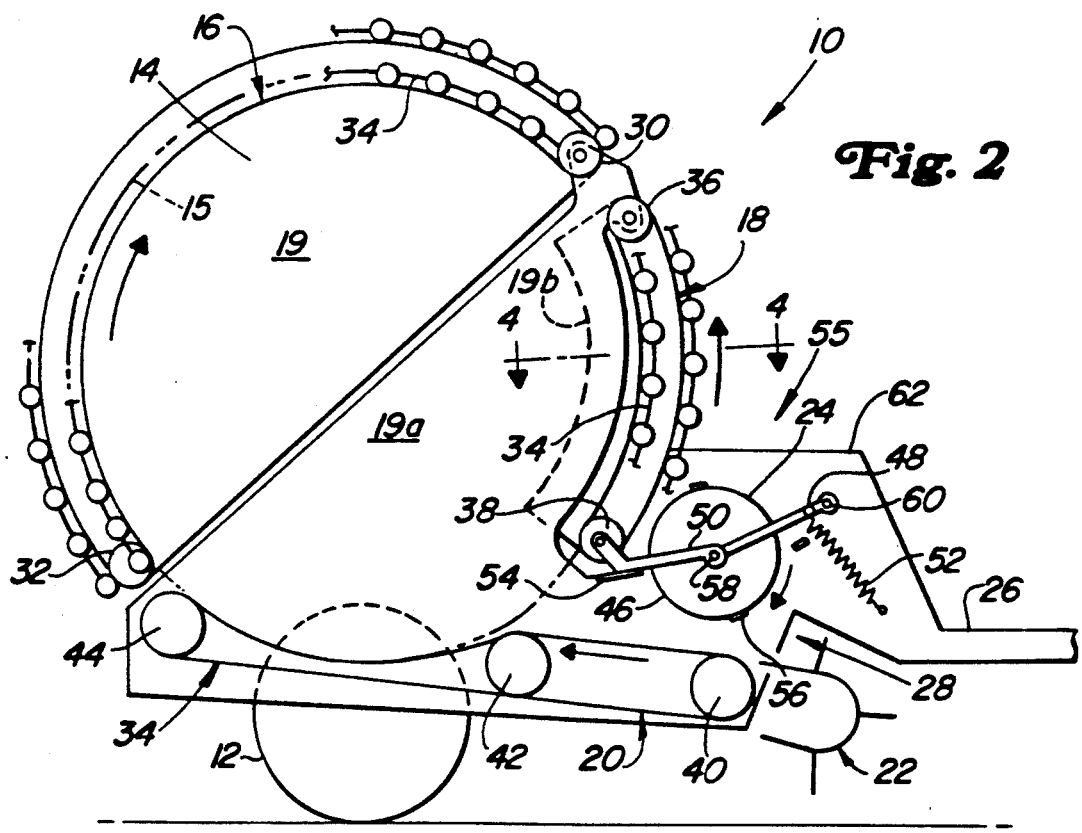
FIG. 2 is a view like FIG. 1 but showing, in phantom, a substantially completed bale in the baling chamber and showing the crop flow sensing roller in an elevated position and the forward conveyor section lifting the bale as would be the case when a mat of crop of increased thickness is passing beneath the roller.

Its inner surface lies in the same circle arc as that of the first wall segment 16. In its end regions shafts 36 (above) and 38 (below) are provided, that guide the continuous conveyor 34 among other functions. The upper shaft 36 is rigidly retained in the side walls 19 and is located immediately adjacent and parallel to the shaft 30, so that almost no gap at all exists between the two wall segments 16, 18. The lower shaft 38 can swing together with the entire wall segment 18 about the upper shaft 36 to a limited degree perpendicular to the plane of the drawing; FIG. 2 shows the forward wall segment 18 in a rearwardly rotated position.

Nearly all of the remaining circumference of the baling chamber 14 is enclosed by the conveyor 20. This conveyor 20 extends from the collector 22, past the wheels 12 and up to the shaft 32 at the lower end of the rear wall segment 16. The continuous conveyor 34 used also in the conveyor 20 extends with its span in its empty condition of the baling chamber 14 in a generally horizontal plane and is supported by a forward, a middle and a rear roller 40, 42 and 44, respectively. The forward and/or the rear roller 40, 44 can be utilized to drive the continuous conveyor 34 of the lower conveyor 20. The forward roller 40 is located generally below the sensor 24 and the rear roller 44 is immediately adjacent to the lower shaft 32 of the first wall segment 16. The middle roller 42 is so arranged that it forms, together with the rear roller 44, one of two loading devices for the developing bale 15, whereby the portion of the upper span of the continuous conveyor 34 between the middle and rear rollers 42,44 is stretched downward corresponding to the outer shape of the bale 15. The continuous conveyor 34 of the lower conveyor 20 is driven from front to rear in its upper span in the indicated direction of the arrow.

The collector 22 is configured as a conventional pick-up and hence is equipped with constantly circulating teeth that move upward and to the rear lifting the crop, such as straw, hay, silage etc. from the ground and throwing it upon the upper span of the conveyor 20.

The sensor 24 includes in particular a pressure roller 46, a swinging arm 48, a control arm 50, a power storage device 52 and a stripper 54, that constitute, together with the forward wall segment 18, a mechanical control device 55 that can modify the path of movement of the bale 15.

The pressure roller 46 is preferably configured as a hollow cylinder, not driven, and equipped on its outer surface with several equally spaced impeller bars 56. The diameter of the pressure roller 46 is considerably larger than the forward roller 40, so that, with the aid of the impeller bars 56, it is brought into rotation upon contact with the crop transported along the conveyor 20 and permits the crop to pass without hindrance.

The swinging arm 48 is connected with the control arm 50, free to rotate, in a joint 58, which also supports the pressure roller 46, free to rotate, and can move within the plane of the drawing. For this purpose it is also attached, free to rotate in the plane of the drawing, in a bearing 60 at the frame component 62 of the round baler 10.

The control arm 50 engages at one end with the joint 58 and at the other end with the lower shaft 38, free to rotate in each case.

The power storage device 52, which is here configured as a mechanical helical extension spring, engages at one end the frame component 62 and at the other end, the swinging arm 48 between the joint 58 and the bearing 60. The power storage device 52 operates in such a way that the swinging arm 48 is forced in counterclockwise direction toward the conveyor 20.

The stripper 54 is provided between the inlet to the baling chamber 14 and the pressure roller 46 and is brought into close proximity with the impeller bars 56 so that no crop can wrap itself around the pressure roller 46.

The swinging and adjusting arms 48 and 50 comprise a lever mechanism that is provided at each end face of the pressure roller 46 in identical form as is the power storage device 52, which operate in such a way that the pressure roller 46 is forced against the flow of the crop that is transported by the conveyor 20 with a predetermined force, and is retained in a fixed position when no crop is being transported. The lever mechanism thus formed does not normally assume an extended position, but a position angled downward, that is, the swinging and control arms 48 and 50 do not normally extend their longitudinal centerlines in the same direction; rather these converge and meet at a point below an imaginary line from the bearing 60 to the joint 58. The final result is that the bearing 60 is in a fixed position; the pressure roller 46 can move upward, and the control arm 50 can pivot about the upper shaft 36 in an arc together with the second wall segment 18. Thereby the lever mechanism is moved towards its extended position, the pressure roller 46 is raised and thereby moves the position of the joint 58. Such lifting of the pressure roller 46 takes place when more crop is conveyed upward by the collector 22 than is presently accommodated between the underside of the pressure roller 46 and the upper span of the conveyor 20 or the forward roller 40.

As a result of the increasing flow of crop the pressure roller 46 is raised against the force of the power storage device 52 and the lever mechanism approaches its extended position. Since the swinging arm 48 cannot deflect due to the fixed bearing 60, the pressure roller 46 performs a pivoting motion in clockwise direction about the bearing 60 when it is raised, and thereby moves the control arm 50 toward the baling chamber 14, whereupon the second wall segment 18 is pivoted about the upper shaft 36 also in the clockwise direction. Accordingly it can be seen that the amount by which the pressure roller 46 is raised by virtue of the flow of the crop taken in is directly related to the degree of rotation of the second wall segment 18.

By reason of the above described movement of the second wall segment 18, the baling chamber 14 is narrowed to a greater or lesser degree above the inlet opening 28, that is, compressed inwardly or expanded. In the case first mentioned the result is that the bale 15 is raised slightly from the middle roller 42 and its weight shifted largely to the rear roller 44. Since the forward wall segment 18 remains in its inward position and is again moved only upon a change in the height of the crop flow, the bale 15 continues to rotate in its new position. Therefore, depending on the amount of inward movement of the forward wall segment 18, the bale 15 is lifted either completely from the conveyor 20 in the region of the middle roller 42 and a wedge-shaped gap is created there, or the contact force in this region is reduced. In both cases the incoming crop flow can more easily penetrate the space between the outer circumference of the bale 15 and the surface of the conveyor 20 and be carried along. Since the bale 15 is raised above the middle roller 42 to a greater degree with an increasing flow of the crop between the pressure roller 46 and the conveyor 20, even very large crop flows do not present a danger of clogging.

In the preferred embodiment a pressure roller 46 is provided as sensor 24 that acts upon the forward wall segment 18 by means of the control arm 50. Instead of this, although it is not shown, an acoustic or optical distance measuring device could be used in its place, that detects the thickness of the flow of crop transported and transmits that to a control instrument. From these data the control instrument could develop an output signal that can be supplied to an adjusting motor which changes the position of the forward wall segment 18.

FIG. 3 shows a continuous conveyor 34 that is advantageously configured as conveyor 20 and applied to the wall segments 16, 18.

This continuous conveyor 34 contains a belt 64 composed of rubber, that occupies generally the width of the baling chamber 14. Alternatively thereto any other flexible belt of cloth, plastic or metal could be applied. The belt 64 is equipped with rods 66 that extend to both sides beyond the belt. At the ends of the rods 66, rollers 68 are attached, free to rotate, whose purpose will be described below.

FIG. 4 depicts the continuous conveyor 34 forming part of the wall segment 18. The conveyor extends over the side walls 19a and for the purpose of containing crop material within the bale chamber 14, the wall segment 18 side walls 19b lie in a plane adjacent walls 19a. The outer edge of each side wall 19b is provided with a U-shaped channel 70, open towards the baling chamber 14, in which the rollers 68 of each span can roll, while the rollers 68 of the other span roll along the outer surface of a wall 72 of the channel 70.

FIG. 5 shows the upper end of a channel 70 with a sprocket 74 that is attached, free to rotate, by a screw 76 to the side wall 19. The outer circumference of the sprocket 74 is provided with notches 78, that can engage the projections of the rods 66 that extend beyond the belt 64. At each wall segment 16,18 and at the conveyor 20 at least one or a pair of the sprockets 74 are driven, so as to propel the continuous conveyor 34.

This type of continuous conveyor 34 has the advantage that, due to its closed surface, small crop particles cannot escape from the baling chamber 14, but that these are incorporated into the bale 15. In addition the rods 66 assure that the continuous conveyor 34 does not run askew. Finally the rollers 68 running within the channel 70 assure perfect sideways guidance for the continuous conveyor 34. The shape of the channel 70 or the several channels 70 on the wall segments 16, 18 or on the conveyor 20 corresponds to the predetermined path of the continuous conveyor 34 and hence is curved along the wall segments 16, 18 as can be seen in FIG. 1.

I claim:

1. In a round baler including a baling chamber having an inlet opening located at a lower forward location thereof, a conveyor provided at the bottom of the baling chamber for supporting a bale being formed in the baling chamber and a pickup for elevating crop from the ground and depositing it on the conveyor, characterized by a control device mounted on the baler above a forward portion of said conveyor and adjacent said inlet opening; said control device including a first means for monitoring the flow of crop carried into the inlet opening by said conveyor and second means associated with the first means for being moved rearwardly in increasing amounts by the latter in response to increasing amounts in the volume of crop flow to thereby effect a lifting force on a contacted bale which increases in response to increasing crop flow and thereby facilitate the feeding of the crop between the conveyor and the bale being formed.

2. The round baler defined in claim 1 wherein the second means of the control device includes a movable wall segment forming a forward part of the baling chamber.

3. The round baler defined in claim 2 wherein said wall segment is arcuate.

4. The round baler defined in claim 3 wherein the wall segment is defined in part by an endless conveyor extending between opposite side walls of the baling chamber.

5. The round baler defined in claim 4 wherein the wall segment has an outer extremity defined by inwardly opening arcuate channels at opposite sides of the baling chamber; said endless conveyor including a flexible member extending between the channels and having a plurality of rollers supported at opposite sides thereof with some of the rollers at each side being located within and guided by one of the channels and with others of the rollers at each side being located exteriorly on an outer wall of said one of the channels.

6. The round baler defined in claim 5 wherein said flexible member is a rubber mat having a plurality of rods molded therein and having opposite ends extending beyond opposite edges of the mat; and said rollers being mounted to the opposite ends of the rods.

7. The round baler defined in claim 1 wherein said first means of the control device includes a pressure roller, an arm means vertically pivotally mounted to the baler and having the roller rotatably mounted thereto and biasing means urging the arm means downwardly to thereby urge the roller against crop carried by the conveyor whereby the roller will rise and fall in accordance with the thickness of a crop mat passing therebeneath; and said second means being connected to said arm means.

8. The round baler defined in claim 7 wherein said second means of the control device is formed in part by a pivotally mounted forward wall segment forming a forward portion of the baling chamber and motion transfer link means connected between said arm means and said forward wall segment for causing rearward and forward swinging movement of the forward wall segment respectively in response to rising and falling movement of the pressure roller, whereby the forward wall segment will engage and exert a lifting force on a bale being formed when an increase in crop flow occurs thereby relieving some of the resistance to crop being fed beneath the bale.

* * * * *